Oct. 13, 1964   L. A. KILLE ETAL   3,153,195
RADIO TRANSMITTER FOR USE WITH FLASH PHOTOGRAPHY
Filed June 20, 1962

INVENTORS.
Leonard A. Kille
BY Robert L. Norton
Brown and Mikulka
ATTORNEYS

3,153,195
RADIO TRANSMITTER FOR USE WITH FLASH PHOTOGRAPHY

Leonard A. Kille, Stoneham, and Robert L. Norton, Norfolk, Mass., assignors to Polaroid Corporation, Cambridge, Mass., a corporation of Delaware
Filed June 20, 1962, Ser. No. 203,997
11 Claims. (Cl. 325—102)

The present invention relates to flash photography and more particularly to a transmitting device which is mounted in a camera flash mechanism and emits an actuation signal for remote flash means when the camera is operated.

It is a primary object of the present invention to provide a compact transmitter device which is designed to mount within and be secured to a camera flash mechanism.

It is a further object of the present invention to provide such a device which comprises a molded housing means, a mounting means forming a part of said housing means and used to position the device within a camera flash means, and means for transmitting an actuating signal to a remote flash means.

It is an additional object of the present invention to provide such a device wherein the mounting means comprises a specially shaped arm which performs the functions of mounting and securing the device to a camera flash means and additionally provides a means for electrically connecting flash contacts actuated by operation of the camera to a transmitter located in the housing means of the present invention.

Other objects of the invention will in part be obvious and will in part appear hereinafter.

The invention accordingly comprises the apparatus possessing the construction, combination of elements, and arrangement of parts which are exemplified in the following detailed disclosure and the scope of the application of which will be indicated in the claims.

For a fuller understanding of the nature and objects of the invention, reference should be had to the following detailed description taken in connection with the accompanying drawings wherein.

Present photographic techniques often require the use of auxiliary lighting sources which are proximate to but not connected to a camera used to photograph the illuminated subject. The device of the present invention provides a compact actuation means for such a remote lighting source which may be conveniently mounted on a camera. In a preferred use, the device in conjunction with the camera emits inductively tuned signals within a radius of approximately 30 feet when the camera is operated. These signals are used to actuate the remote flash means such that a high intensity artificial light is provided synchronously with operation of the camera. The device of the present invention is designed to mount in a camera flash mechanism. This camera flash mechanism is of the type used in the Polaroid Land Camera J series and is more fully described in copending U.S. application Serial No. 102,047 filed April 10, 1961. Although designed primarily for use with this type of flash mount, the present invention may be used with other cameras having a similar flash mechanism, the essential requirements of which are a receptacle portion into which a mounting arm of said device fits to establish an electrical contact and a rear structure such as a reflector upon which the device may be hooked to position and secure it within the flash mechanism.

Figure 1:
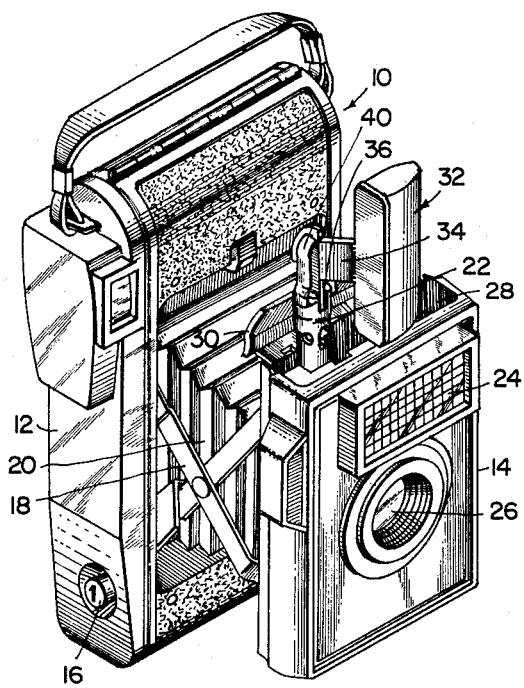
FIGURE 1 is a front perspective view of a camera having the device of the present invention mounted thereon.
Figure 4:
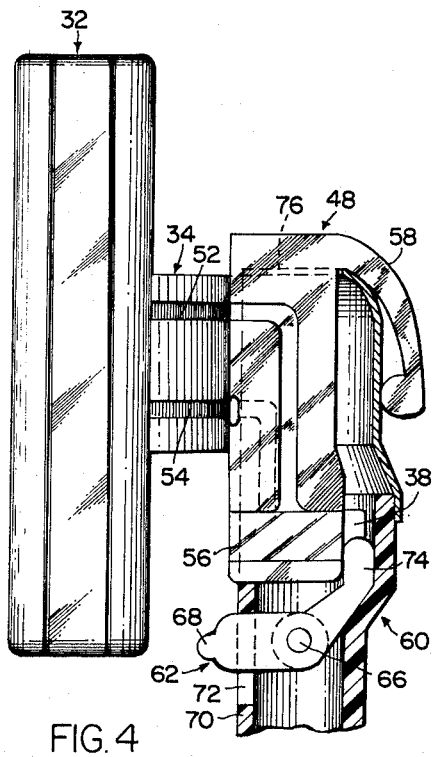
FIG. 4 is a side view partially in section of the device of the present invention mounted in a flash mechanism.

Referring now to the drawings, FIGURE 1 shows the device of the present invention mounted on one of a type of the J series of Polaroid Land Cameras. The camera is here shown in the open position with the front housing extended from the main body of the camera as it would be in normal operation. Camera 10 comprises a main housing 12 and a front housing 14. A release button 16 is depressed to allow the front housing 14 to be extended from the body of the camera. The front housing is mounted on a scissor-type erecting mechanism 18 and has a lighttight bellows 20 connecting front housing 14 to the body of the camera. The front housing contains a shutter and a switch-actuating mechanism for firing a flash mechanism 22. The shutter also has a photocell 24 which is used in the electronic timing circuit of the shutter mechanism and a lens 26. Flash mechanism 22 is mounted in a recess or well 28 formed in the side wall of the camera front 14. When the camera front is in the closed position, flash mechanism 22 is recessed in well 28, and the well is covered by a cover portion 30. In this illustration, a flash transmitter device 32 is shown mounted within flash mechanism 22 by means of a mounting arm 34. The mounting arm fits in a side cutaway portion 36 of flash mechanism 22 to engage a pair of terminals 38 as shown in FIG. 4. A further portion of mounting arm 34 fits within and is hooked over a flash reflector 40 so as to position and secure device 32 within the flash actuating mechanism. As can be clearly seen from FIGURE 1 the cutaway portion 36 of flash mechanism 22 allows either a flash bulb or, in this case, a transmitting device to be inserted into the electrical contacts of the flash mechanism without removing the reflector shield. Device 32 is actuated upon depressing a button 16 which causes operation of the camera shutter means. As seen from this illustration, mounting arm 34 of the transmitter device is bent such that the transmitter, when it is mounted, does not come into contact with the camera front 14 or in any way interferes with other elements of camera 10.

Figure 2:
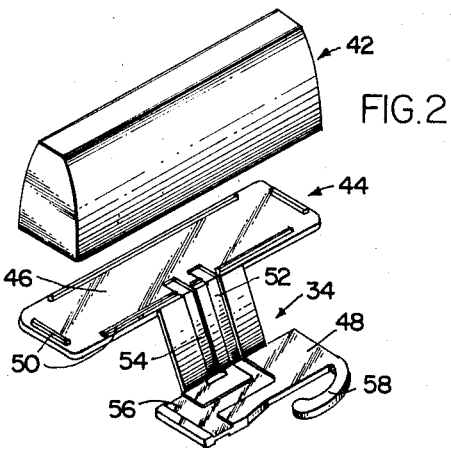
FIG. 2 is a view of the molded members comprising a housing and mounting means of the present invention.

FIG. 2 is a view of the members which comprise a housing and mounting means for the present invention. These members are two: a cover member 42 is a substantially rectangular box with the upper sides thereof convergent to give a semirounded effect to the member; and a base member 44. Both cover member 42 and base member 44 are of a molded material which is substantially magnetically and electrically nonconductive. Base member 44 comprises a flat portion 46 upon which cover member 42 is mounted; and a mounting arm 34 which is connected at an angle less than 90° to the side of the flat base portion, this mounting arm having a further section 48 at an angle to the end thereof. Flat base portion 46 has ridges 50 along the sides thereof to position cover member 42 thereupon. In assembly of the device, the cover member is sealed to this flat portion after the electronic assembly shown in FIG. 5 has been mounted upon the flat portion. Flat portion 46 provides a surface means upon which a terminal board for the electronic means may be mounted and secured. Base member 44 has recesses 52 and 54 extending from base portion 46 along mounting arm 34 to portion 48 thereof. These recesses are designed to allow insertion of conductive strips, as for example a copper strip, which are used to connect the transmitter electronics to electrical contacts within the flash mechanism, as illustrated in FIG. 4, transmitter contacts to the flash contacts being made by wide strips 56 at the base of section 48. While both recesses start off on the same side of the mounting means due to originally making contact on the same side of surface 46, recess 54 passes through a hole in the mounting arm to provide for contacts on both sides of head section 48. Mounting arm 34 has a gripping section 58 extending from the top thereof and running parallel to the edge of and in the same plane as section 48. This hooked spring section is used to position the device about a flash reflector mounted on a flash mechanism and additionally secures the device therein by a gripping action against the reflector.

Figure 3:
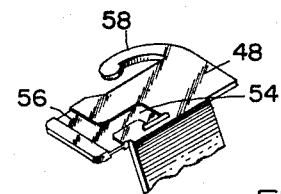
FIG. 3 is a partial side view of a mounting means of the present invention.

The other side of section 48 on the end of mounting arm 34 is shown in FIG. 3. Recess 54 is continued after passing through the member to bring a contact strip to a wider portion 56 which establishes electrical contact with the flash means when the device is mounted within the flash mechanism. FIG. 4 illustrates the device of the present invention mounted in a flash mechanism 22. The flash mechanism comprises a base 60 which has a cutaway portion 36 in the side thereof as shown in FIGURE 1; electrical contacts 38 extending on each side of the cutaway portion within the flash mechanism; an ejection means 62 which is a pivotally mounted member; and reflector 40. Ejection means 62 is an angular member which is pivotally mounted at the center thereof by means of a fastening device through a hole 66 in said member. One arm 68 of this member extends through the side wall 70 of the flash mechanism through an opening 72. This member has a rounded tip surface on the outer end thereof. The other arm 74 of the ejection member is curved at the end thereof such that, in its normal position, arm 74 rests against side wall 70 of flash mechanism 22 and has the base of a flash bulb, or a device such as that of the present invention, held by electrical contacts 38 against it. When arm 68 of the member is depressed, arm 74 pivots about hole 66 and acts to force the base portion of such a flash bulb or device outwardly from the electrical contacts of the flash mechanism. This member is also useful when inserting a flash bulb or such a device in that depressing arm 68 moves arm 74 outwardly between electrical contacts 38 and acts to spread these spring-type contacts for easier insertion of an object therebetween. The electrical terminals of mounting section 48 of the device are substantially similar to those of a common type flash bulb such as the AG-1 type bulb manufactured by Sylvania Electric Products, Inc. so that either may be transferably mounted in the flash mechanism socket. Reflector 40 is constructed of a metallic material and is pressure fitted about mechanism 22 by means of right angular portions on the base of the reflector which fit into corresponding grooves on the side of the flash mechanism. Reflector 40 is slotted in the top thereof, the slot 76 being of a rectangular shape and extending back to the rear vertical portion of the reflector. It is a feature of the present invention that it is not necessary to remove this flash reflector to mount the device. Rather the reflector itself serves as an additional means of positioning and mounting the device within the flash mechanism.

Figure 5:
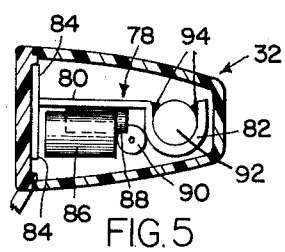
FIG. 5 is a partial side view of the interior of the transmitter housing of the present invention.

FIG. 5 is an interior side view of the transmitter of the present invention illustrating the arrangement and relative location of the parts contained therein. The transmitter housing has a means for mounting an electronic oscillator and a radiating inductive tuner contained therein. This means comprises a mounting board 78. This mounting board has a lower flat section 80 and an upper semicylindrical section 82. The base of the lower flat portion is secured to base member 44 of the transmitter housing by appropriate fastening means through right angle feet 84 at the base of the mounting board. The mounting board contains transistors represented as 86, resistors represented as 88 and a capacitor represented as 90, mounted along one side of the lower flat surface thereof. By mounting all components on one side of the board, the leads from these components may be extended through holes on the mounting board with all soldering of components and electrical connections being made on the other side of the board. A ferrite core antenna 92 is mounted in semi-cylindrical portion 82 of the mounting board, preferably being secured by a potting compound 94 along the edges thereof. These components are electrically connected to the flash actuating mechanism by means of the conductive strips previously discussed but not shown in this drawing.

Figure 6:
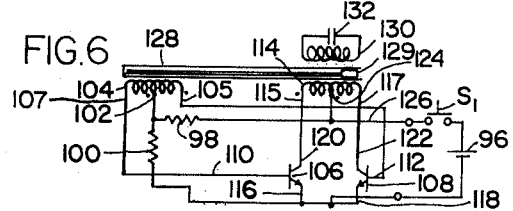
FIG. 6 is an electronic schematic diagram of the circuit of the present invention.

The electronic schematic diagram of the circuit of the present invention is illustrated in FIG. 6. A switch S1 provides an actuation means to turn on a circuit. Switch S1 represents the usual flash-synchronization contacts forming a part of the camera shutter and is actuated by depression of shutter button 16, shown in FIGURE 1, which also operates the camera shutter mechanism. When this switch is closed, battery 96 is connected into the circuit through a voltage divider comprising resistors 98 and 100. These resistors form a voltage divider which acts to bias the transistors of the circuit into conduction so that the oscillator of the circuit will start. A tap 102 to inductance 104 is connected between the resistors of the voltage divider. The other end of the battery 96 is connected to a common point. The circuit has two transistors 106 and 108 contained therein. Base 110 of transistor 106 is connected to one end 107 of inductance 104. Base 112 of transistor 108 is connected to the other end 105 of inductance 104. The transistor emitters 116 and 118 are connected to a common point. The output of transistor 106 at collector 120 is connected to one end 115 of inductance. The output of the second transistor 108 at collector 122 is connected to the other end 117 of inductance. Inductance 114 has a tap 124 thereon which is connected to line 126. Inductance 114 may be considered a primary winding about core 128 with a secondary winding or inductance 130 also being wound thereupon. Inductance 130 has a capacitor 132 connected thereacross. The value of this capacitor is selected for the particular frequency it is desired to have the transmitter emit, the frequency in this case being approximately equal to the formula:

$$f = \frac{1}{2\pi\sqrt{LC}}$$

Core 128 is of a common ferrite type and has a slug 129.

The circuit is similar to that of a push-pull amplifier in that transistors 106 and 108 are alternately conducting. Although the present circuit uses two transistors to increase the output efficiency, it should be understood that a circuit using only one transistor might also be used. When switch S1 is closed, current flows through the voltage divider and tap 102 of inductance 104. When the bases 110 and 112 of transistors 106 and 108 are alternately positively biased the particular transistor becomes operative. Inductance 114 is tapped at point 124 and connected back into line 126 feeding the voltage dividers and inductance 104. A regenerative or feedback path is thus set up causing the circuit to oscillate.

The signal in the primary winding (inductance 114) introduces a voltage into the secondary winding (inductance 130) of the core 128. Inductance 130 is adjusted to the exact resonance frequency desired by varying the position of the slug 129 within core 128.

The device of the present invention thus provides a compact transmitter which is designed to mount within and be secured to a particular type of camera flash mechanism. The device is actuated by operation of the camera which actuates electrical contacts within said flash mechanism.

Since certain changes may be made in the foregoing device without departing from the scope of the invention herein involved, it is intended that all matter contained in the above description and shown in the accompanying drawings shall be interpreted as illustrative and not in a limiting sense.

What is claimed is:

1. A transmitter device to actuate remote flash means adapted for use with a photographic camera having a shutter means and a flash means actuated thereby wherein said flash means is retractable into the housing of said camera and has actuation means contained therein, comprising, in combination:

a housing means comprising a cover member and a base member, said members being of a molded material;

said base member having a mounting means extending from the side thereof, said mounting means positioning said device within said flash means, said mounting means providing a connection to said actuation means within said flash means, said mounting means being constructed and arranged with rsepect to said flash means to permit retraction of said flash means within said camera housing with said transmitter device mounted thereon; and means for transmitting an actuation signal to said remote device.

2. A transmitter device to actuate remote flash means adapted for use with a photographic camera having a shutter means and a flash means actuated thereby wherein said flash means comprises a receptacle portion and a reflector portion, comprising, in combination:

a housing means comprising a cover member and a base member, said members being of a molded material; and a mounting means extending from the side of said base member, said mounting means being a molded arm, said arm fitting within said flash receptacle portion and positioning said device with respect to said flash means, said arm being a means for electrically connecting a transmitter in said housing to actuating means contained in said receptacle portion.

3. A radio transmitter device to actuate remote flash means adapted for use with a photographic camera having a shutter means and a flash mechanism actuated thereby, comprising, in combination:

a main housing comprising a cover member and base member, said housing containing a mounting means for an electronic oscillator and a radiating inductive tuner;

said mounting means being constructed from a substantially magnetically and electrically non-conductive material, said mounting means having a lower flat surface for mounting electric components thereon and a semicylindrical top portion to enclose a ferrite core, said mounting means having feet located on the base thereof, said feet providing a means for securing said mounting means to said base member;

said base member having an arm extending from the side thereof, said arm providing a means for mounting the device within said flash mechanism.

4. A radio transmitter device to actuate remote flash means adapted for use with a photographic camera having a shutter means and a flash mechanism actuated thereby, comprising, in combination:

a main housing comprising a cover member and a base member;

said base member having an arm extending from the side thereof, said arm being bent at a downward angle to the plane of said base, said arm having a second angular bend at a lower portion thereof, said arm being a means for mounting the device within said flash mechanism.

5. A radio transmitter device to actuate remote flash means adapted for use with a photographic camera having a shutter means and a flash mechanism actuated thereby, wherein said flash mechanism consists of a receptacle base portion and a reflector mounted thereon and said base portion has electrical contacts therein to provide an electrical connection to flash actuating means within said camera operated by said shutter means, comprising, in combination:

a main housing comprising a cover member and a base member;

said base member having an arm extending from the side thereof, said arm being centrally located on said side, said arm being substantially T shaped with the head portion of said T being furthest from the base section of said base member, said head portion having electrical contacts on one end thereof, said head portion having a hook-shaped extremity on the outer edge thereof whereby the head of said T shaped arm provides a means for mounting said device within said flash mechanism; and said electrical contacts of said T shaped arm positioned to engage said receptacle base portion electrical contacts whereby said device may be actuated.

6. A radio transmitter device to actuate remote flash means adapted for use with a photographic camera having a shutter means and a flash mechanism actuated thereby wherein said flash mechanism contains electrical actuating contacts therein, comprising, in combination:

a main housing comprising a cover member and a base member having a T shaped arm on the side thereof, the head of said arm being located away from the base portion of said member, the base of said arm being bent downward from the side of said base member, the head of said arm being bent at an angle to said base of said arm so as to be substantially parallel with the base portion of said base member;

said arm having recesses therein which provide a means for mounting conductive strips to connect a transmitter means within said main housing to said flash actuating contacts, said base of said arm having two parallel recesses on a surface thereof, one of said recesses passing through said arm at the junction of said base and head of said arm to the other side of said head, the other of said recesses extending to one end of said head on the same side as that of the said arm base, said head of said arm therefore having electric contacts to said transmitter on both sides of one end thereof; and said arm providing a means for mounting the device within said flash mechanism.

7. A radio transmitter device to actuate remote flash means adapted for use with a photographic camera having a shutter means and a flash mechanism actuated thereby wherein said flash mechanism has a base receptacle portion with a reflector portion mounted on the top thereof and said reflector has a slot on top thereof, said slot being substantially rectangular and open at the front edge of said reflector, comprising, in combination:

a main housing comprising a cover member and a base member;

said base member having a T shaped arm extending from a side thereof and centrally located on the side thereof, said arm being bent at an angle at the junctions at the base section of said arm with said housing base member and at the head section of said arm such that said head section and said housing base are substantially parallel planes, said head section having a hooked member extending outwardly from one end thereof and along the side thereof; and a mounting means comprising said head section, said head section of said device mounting arm fitting into said flash mechanism with a portion of said head arm fitting within said reflector slot.

8. A radio transmitter device to actuate remote flash means adapted for use with a photographic camera having a shutter means and a flash mechanism actuated thereby wherein said flash mechanism has a base receptacle portion with a reflector portion mounted on the top thereof and said reflector has a slot on top thereof, said slot being substantially rectangular and open at the front edge of said reflector, comprising, in combination:

a main housing comprising a cover member and a base member;

said base member having a T shaped arm extending from a side thereof and centrally located on the side thereof, said arm being bent at an angle at the junctions at the base section of said arm with said housing base member and at the head section of said arm such that said head section and said housing base are substantially parallel planes, said head section having a hooked member extending outwardly from one end thereof and along the side thereof; and means for mounting the device within said flash mechanism, said means comprising said head section of said device mounting arm, said head section fitting into said flash mechanism with a portion thereof fitting within said slot, said hooked member of said head section extending over and behind said reflector so as to position said head arm within said flash mechanism.

9. A radio transmitter device to actuate remote flash means adapted for use with a photographic camera having a shutter means and a flash mechanism actuated thereby wherein said flash mechanism has a base receptacle portion with a reflector portion mounted on the top thereof and said reflector has a slot on top thereof, said slot being substantially rectangular and open at the front edge of said reflector, comprising, in combination:

a main housing comprising a cover member and a base member;

said base member having a T shaped arm extending from a side thereof and centrally located on the side thereof, said arm being bent at an angle at the junctions at the base section of said arm with said housing base member and at the head section of said arm such that said head section and said housing base are substantially parallel planes, said head section having a hooked member extending outwardly from one end thereof and along the side thereof; and a means for mounting the device within said flash mechanisms, said means comprising said head section of said device mounting arm fitting into said flash mechanism with a portion of said head arm fitting within said reflector slot, said hooked member of said head arm extending over and behind said reflector to position said head arm within said flash mechanism, said hooked member exerting a spring-like force against the rear of said reflector to secure said head arm within said flash mechanism.

10. A radio transmitter device to actuate remote flash means adapted for use with a photographic camera having a shutter means and a flash mechanism actuated thereby wherein said flash mechanism consists of a base receptacle member and a reflector member and said base receptacle member has a cutout front side thereof, said cutout opening into spring loaded electric contacts mounted along the inside surface of said receptacle, and said reflector has a slotted portion in the top front surface thereof, comprising, in combination:

a main housing comprising a cover member and a base member having a T shaped arm extending outwardly from a side thereof, the head of said arm providing a means for mounting said device within said flash mechanism, said head fitting into said base receptacle member and said reflector slotted portion, said head having a hook on the top thereof which fits on said reflector and exerts a force against the side thereof to hold said head in position with respect to said reflector, said head being positioned within said base receptacle member through said cutaway portion of said receptacle member between said electric contacts, said head portion therefore being positioned and secured within said flash mechanism by said reflector slot, said hook gripping arm and said inside surface of said base receptacle member; and said head portion having conductive strips on the sides of the lower end thereof which engage said electrical contacts within said flash receptacle, said conductive strips being connected to transmitting means within said main housing by means of further conductive strips located in recesses on said T shaped arm, said electrical contacts thereby providing a means for actuating said device when said shutter means are operated.

11. For use with a photographic camera having flash contacts whose closing is synchronized with shutter movement, and a flash mechanism retractably connected to said camera, said flash mechanism having reflector means and bulb receiving means, said bulb receiving means being electrically connected to said flash contacts; a transmitter device for actuating remote flash apparatus comprising:

(a) housing means containing electrical means for generating an actuating signal by which said remote flash apparatus is caused to be actuated; and (b) mounting means connected to said housing means and constructed and arranged to engage said reflector means and said bulb receiving means for mechanically attaching said housing means to said flash mechanism so that the latter remains retractable;

(c) said mounting means including electrically conducting means engaged with said bulb receiving means and by which said electrical means is connected to said flash contacts when said flash contacts close for causing said electrical means to generate an actuating signal.

References Cited in the file of this patent
UNITED STATES PATENTS

| | | |
|---|---|---|
| 2,272,102 | Wildman | Feb. 3, 1942 |
| 2,408,764 | Edgerton | Oct. 8, 1946 |
| 2,419,978 | Wildman | May 6, 1947 |
| 2,858,751 | Lopez | Nov. 4, 1958 |
| 2,913,971 | Berkovits | Nov. 24, 1959 |